(12) United States Patent
Lee

(10) Patent No.: US 11,725,630 B2
(45) Date of Patent: Aug. 15, 2023

(54) WIND POWER GENERATION APPARATUS HAVING TOWER CRANE STRUCTURE

(71) Applicant: Ji Su Lee, Chungcheongbuk-do (KR)

(72) Inventor: Ji Su Lee, Chungcheongbuk-do (KR)

( * ) Notice: Subject to any disclaimer, the term of this patent is extended or adjusted under 35 U.S.C. 154(b) by 195 days.

(21) Appl. No.: 17/142,400

(22) Filed: Jan. 6, 2021

(65) Prior Publication Data

US 2021/0239096 A1 Aug. 5, 2021

(30) Foreign Application Priority Data

Jan. 31, 2020 (KR) .................. 10-2020-0011655
Aug. 19, 2020 (KR) .................. 10-2020-0103776

(51) Int. Cl.
| | | |
|---|---|---|
| *F03D 9/43* | (2016.01) | |
| *F03D 7/04* | (2006.01) | |
| *F03D 1/02* | (2006.01) | |
| *F03D 80/30* | (2016.01) | |
| *B66C 23/02* | (2006.01) | |
| *B66C 13/54* | (2006.01) | |
| *B66C 13/40* | (2006.01) | |

(Continued)

(52) U.S. Cl.
CPC ............ *F03D 9/43* (2016.05); *B66C 13/00* (2013.01); *B66C 13/40* (2013.01); *B66C 13/54* (2013.01); *B66C 23/022* (2013.01); *B66C 23/64* (2013.01); *B66C 23/72* (2013.01); *F03D 1/02* (2013.01); *F03D 7/04* (2013.01); *F03D 80/30* (2016.05); *B66C 23/54* (2013.01)

(58) Field of Classification Search
CPC ............ F05B 2240/21; F05B 2240/221; F05B 2240/90; F05B 2240/91; F05B 2240/911; F05B 2240/912; F05B 2240/9121; F05B 2240/915; F05B 2240/9151; Y02E 10/72; B66C 13/40; B66C 23/022; B66C 23/207; B66C 23/30

See application file for complete search history.

(56) References Cited

U.S. PATENT DOCUMENTS 3,894,635 A * 7/1975 Reich .................... B66C 23/283
                                                 212/176
4,196,814 A * 4/1980 Reich .................... B66C 23/30
                                                 212/204

(Continued)

FOREIGN PATENT DOCUMENTS

CN 201764394 U 3/2011
EP 2065331 A2 6/2009

(Continued)

*Primary Examiner* — Christopher R Legendre
(74) *Attorney, Agent, or Firm* — KORUS Patent, LLC; Seong Il Jeong

(57) ABSTRACT

Provided is an eco-friendly wind power generation apparatus that can perform power generation using wind by providing the blades of a wind power generator on a jib of a tower crane, and can perform wind power generation at the optimum altitude and in the optimum direction by automatically or manually performing the lifting or lowering and swing operation of a jib even when wind speed is insufficient because wind is not blowing, or perform wind power generation using artificial wind power generated by the operation of the jib, thereby generating a lot of electricity in necessary places and supply the electricity to all industrial sectors regardless of location and environment.

6 Claims, 8 Drawing Sheets

(51) Int. Cl.
*B66C 23/72* (2006.01)
*B66C 23/64* (2006.01)
*B66C 13/00* (2006.01)
*B66C 23/00* (2006.01)

(56) References Cited

U.S. PATENT DOCUMENTS 9,969,600 B2 * 5/2018 Fenker .................... B66C 13/46
2021/0239096 A1 * 8/2021 Lee ......................... B66C 13/40

FOREIGN PATENT DOCUMENTS

| EP | 2330069 A1 * | 6/2011 | ............. B66C 23/26 |
| JP | 2003-246586 A | 9/2003 | |
| KR | 20-2010-0012278 U | 12/2010 | |
| WO | WO-2018211489 A1 * | 11/2018 | |

* cited by examiner

200

(a)

A-A' SECTIONAL VIEW (b)

WIND POWER GENERATION APPARATUS HAVING TOWER CRANE STRUCTURE

CROSS-REFERENCE TO RELATED APPLICATION

This application claims the benefit of Korean Patent Application Nos. 10-2020-0011655 and 10-2020-0103776 filed on Jan. 31, 2020 and Aug. 19, 2020, respectively, which are hereby incorporated by reference herein in their entirety.

BACKGROUND

1. Technical Field

The present invention relates to a wind power generation apparatus, and more particularly to a wind power generation apparatus having a tower crane structure, to which a tower crane structure is applied, thereby enabling safe and abundant electricity to be generated in a necessary place regardless of an environment such as air volume, wind speed, weather, and location.

2. Description of the Related Art

Recently, with the depletion of coal and petroleum resources, interest in wind power generation as an alternative energy is increasing.

Conventional wind power generation apparatuses have not only the advantage of being simply installed but also the advantage of not generating separate waste. However, they mainly rotate main shafts using large propellers or blades, and generate power by rotating generators connected to the main shafts, so that they have problems in that a facility cost is high because a facility having a large area is Basically required and wind power generation cannot be achieved because the main shafts cannot be rotated during weak winds.

In addition, the conventional wind power generation apparatuses are installed in high mountain areas where there is a lot of wind. In order to build the wind power generation apparatuses in high mountain areas and build electric wire poles and pathways, damage to natural environments is inevitable.

Meanwhile, tower cranes were developed for port loading and unloading or for high-rise construction, are installed on the fleet and quay walls of shipyards, and are widely used in high-rise buildings and apartment construction sites. Cranes are classified into jib-type cranes and hammer head-type cranes according to the shape of their top part. Jib (arm-shaped)-type cranes are formed by installing a rotating frame on the top of a tower and attaching a jib, and perform the operation of selectively lifting and lowering cargo by the rotation or linear operation of a trolley. The hammer head-type cranes are formed by installing a swing frame on the top of a tower and mounting a boom on the swinging frame to achieve left-right balance, and are used to move a load horizontally.

An example of a conventional jib-type tower crane is disclosed in Korean Patent No. 10-2014-0113984. As shown in FIG. 1, a crane body 100' includes a base 110', a mast 120' installed long above the base 110', and a jib 130' connected to the upper portion of the mast 120' along a direction that crosses the mast 120'. In order to install the conventional tower crane, a sufficient area is required, but the installed tower crane has a limitation in that it is used for the work of moving cargo in a construction site.

Therefore, there is a need for a tower crane-type eco-friendly wind power generation apparatus that overcomes the concepts of the conventional tower cranes and the conventional wind power generation apparatuses, and is formed by installing a wind power generator on a tower crane used at a construction site so that the crane-type eco-friendly wind power generation apparatus contributes to industrial development by safely generating a lot of electricity without being restricted to an environment, unlike the conventional wind power generation apparatuses.

SUMMARY

The present invention has been conceived to overcome the above-described problems, and an object of the present invention is to provide a wind power generation apparatus having an existing tower crane structure, which allows power required for an industrial site to be produced. In other words, an object of the present invention is to provide a wind power generation apparatus having a tower crane structure, in which a jib is equipped with the blades of a wind power generator, the wind power generation apparatus is installed at various construction sites or workplaces as needed, and wind power generation is performed by the elevation/lowering or swing operation of the jib in the process of moving a work target object using a tower crane or by forming artificial wind power through the automatic operation of the jib according to a preset program.

According to an aspect of the present invention, there is provided a wind power generation apparatus having a tower crane structure, the wind power generation apparatus including: a basic mast installed perpendicularly to a basic anchor fixed to the ground; a cab frame installed on the basic mast; a tower head installed at the upper end of the basic mast above the cab frame, and including a lightning rod; a jib unit provided on the top of the basic mast to perform a lifting or lowering operation and a swing operation; a telescopic cage unit installed on the basic mast, and including a hydraulic lifting device (not shown) that selectively lifts and lowers the jib unit by adjusting the mast; a swing device control gear unit configured to swing the jib unit; and one or more blade modules coupled to ends of the jib unit, and configured to be rotated by wind power to generate electricity; and further comprising a remote control unit connected to the jib unit via a wired or wireless connection and configured to remotely control an operation thereof; wherein, when wind speed is not insufficient, the remote control unit performs wind power generation in such a manner as to rotate the blade modules using the wind power, generated by the operation of the jib unit, by automatically operating the jib unit according to a preset program or by manually operating the jib unit.

The jib unit may include: a main jib connected to the swing device control gear unit to swing; a counter jib connected to the swing device control gear unit to swing; a main jib tie bar provided with one end connected to the main jib and a remaining end connected to the tower head to form tension; a counter jib tie bar provided with one end connected to the counter jib and a remaining end connected to the tower head to form tension; and a hoisting wire rope provided with one end coupled to an end of the main jib and a remaining end connected to the tower head.

The remote control unit may collect weather information in real time, may determine three-dimensional (3D) location information of the jib unit based on the collected weather information, may generate x-, y- and z-axis displacement values by comparing the determined three-dimensional location information with current three-dimensional location information of the jib unit, may generate an operation signal based on the generated displacement values, and may transfer the generated operation signal to the telescopic cage unit and the swing device control gear unit; and the telescopic cage unit may read a z-axis displacement value included in the operation signal, and may transmit the z-axis displacement value to the hydraulic lifting device, thereby allowing the jib unit to be selectively raised and lowered such that a current height (in the z axis) of the jib unit reaches a determined height (in the z axis) of the jib unit.

The swing device control gear unit may read x- and y-axis displacement values included in the operation signal, and may swing the jib unit so that a current location (in the x and y axes) of the jib unit reaches a determined location (in the x and y axes) of the jib unit.

The remote control unit may determine the number of rotations, direction of rotation, and number of elevation/lowering acts of the jib unit based on collected weather information, may generate a plurality of operation signals, and may transmit a series of operation signals to the telescopic cage unit and the swing device control gear unit; and the telescopic cage unit and the swing device control gear unit may perform the lifting/lowering operation and swing operation of the jib unit according to the series of operation signals for a preset time, thereby forming artificial wind power and thus performing power generation via the blade modules.

The counter jib may further include a counterweight, and the main jib may further include a trolley located inside the main jib and configured to be transferred along the main jib and determine a swing radius for hoisting work, so that the wind power generation apparatus functions as a tower crane when necessary.

The blade module may include a base frame configured such that a plurality of blade propellers is connected thereto, and a motor unit installed inside the base frame in a widthwise direction.

The motor unit may include a plurality of ball screw devices driven by a drive motor, a drive sprocket, a chain, and a driven sprocket.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Figure 1:
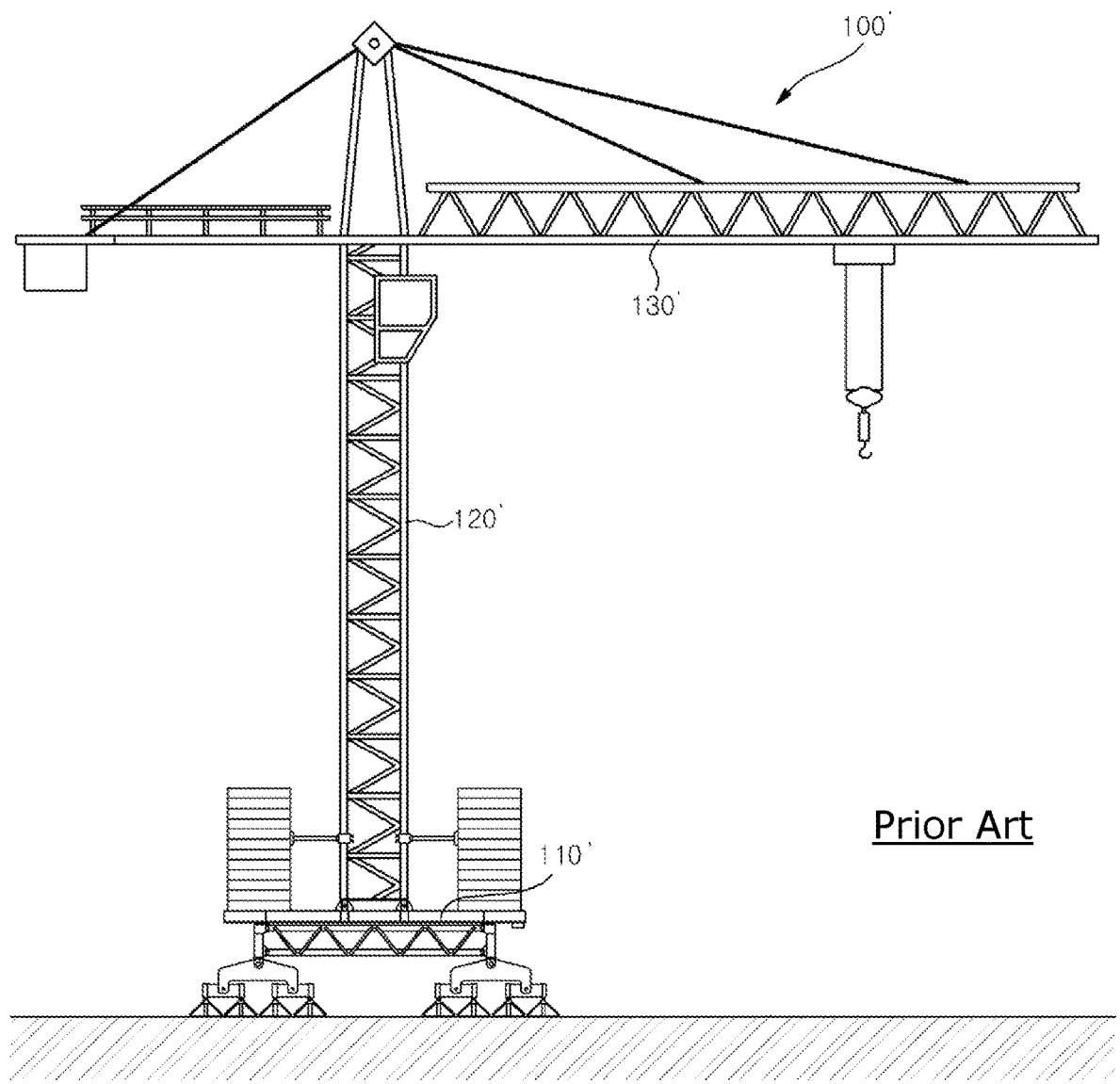
FIG. 1 is a view showing the structure of a conventional tower crane.

Preferred embodiments of the present invention will be described below with reference to the accompanying drawings. In this process, the thicknesses of lines or sizes of components shown in the drawings may be exaggerated for clarity and convenience of description.

Furthermore, terms to be described later are terms defined by considering functions in the present invention, which may vary according to the intention or custom of users or operators. Accordingly, the definitions of these terms should be made based on the content throughout the present specification.

Additionally, the following embodiments are not intended to limit the scope of the present invention, but are merely exemplary items of the components presented in the claims of the present invention. Embodiments that are included in the technical spirit throughout the specification of the present invention and include components that can be substituted as equivalents in the components of the claims may be included in the scope of the present invention.

Figure 2:
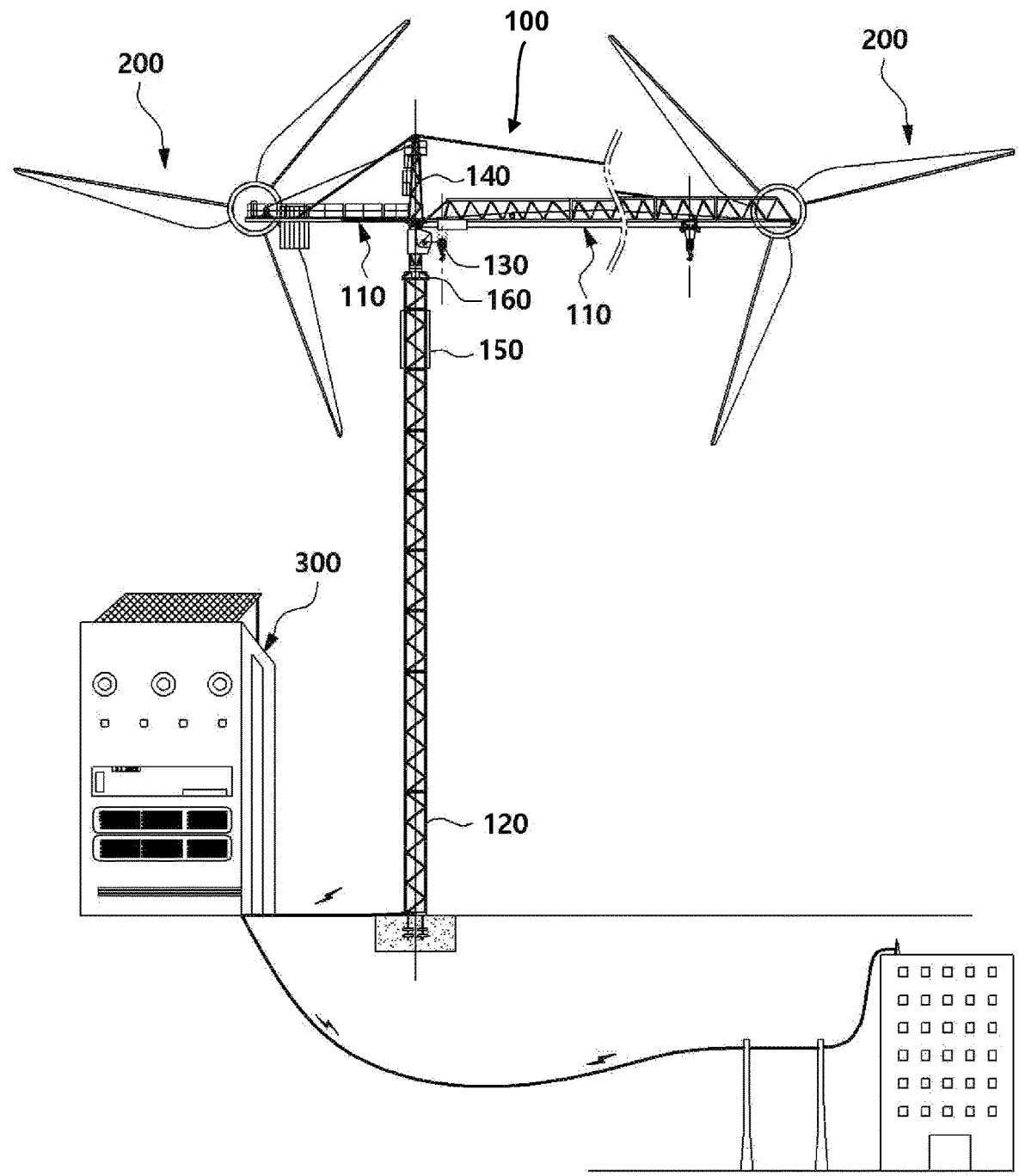
FIG. 2 is a side view schematically showing the structure of a wind power generation apparatus having a tower crane structure according to the present invention.

FIG. 2 is a side view schematically showing the structure of a wind power generation apparatus having a tower crane structure according to the present invention.

Referring to FIG. 2, the wind power generation apparatus having a tower crane structure includes: a basic mast 120 installed perpendicularly to a basic anchor fixed to the ground; a cab frame 130 installed on the basic mast 120; a tower head 140 installed at the upper end of the basic mast 120 above the cab frame 130, and including a lightning rod; a jib unit 110 provided on the top of the basic mast 120 to perform a lifting or lowering operation and a swing operation; a telescopic cage 150 installed on the basic mast 120, and including a processor and a hydraulic lifting device (not shown) that selectively lifts and lowers the jib unit 110 by adjusting the mast; a swing device control gear unit 160 that includes a processor and a gear configured to swing the jib unit 110; and one or more blade modules 200 coupled to ends of the jib unit 110, and configured to be rotated by wind power to generate electricity; and further includes a remote control unit 300 connected to the jib unit 110 via a wired/wireless connection and configured to remotely control the operation thereof. When wind speed is not desirable, the remote control unit 300 performs wind power generation in such a manner as to rotate the blade modules 200 using the wind power, generated by the operation of the jib unit 110, by automatically operating the jib unit 110 according to a preset program or manually operating the jib unit 110. The hydraulic lifting device of the telescopic cage unit 150 includes a pump (not shown) and a motor (not shown), and a ram with a climbing shoe, a support shoe, a platform, and a drive rail are further attached to the telescopic cage unit 150. Furthermore, the hydraulic lifting device (not shown) is installed on the climbing part of the basic mast 120.

As described above, the wind power generation apparatus according to the present invention has a tower crane structure used in a construction site, and is provided with a wind power generator on a jib, and thus electricity essential for industrial sectors may be safely produced and supplied to necessary places regardless of the location and environment. Furthermore, a lot of electricity may be generated in an eco-friendly wind power generation manner without damaging nature and the environment unlike a conventional wind power generator. Moreover, the remote control unit 300 has an effect of supplying the generated electricity to various industrial sectors and households that require electricity.

Figure 3:
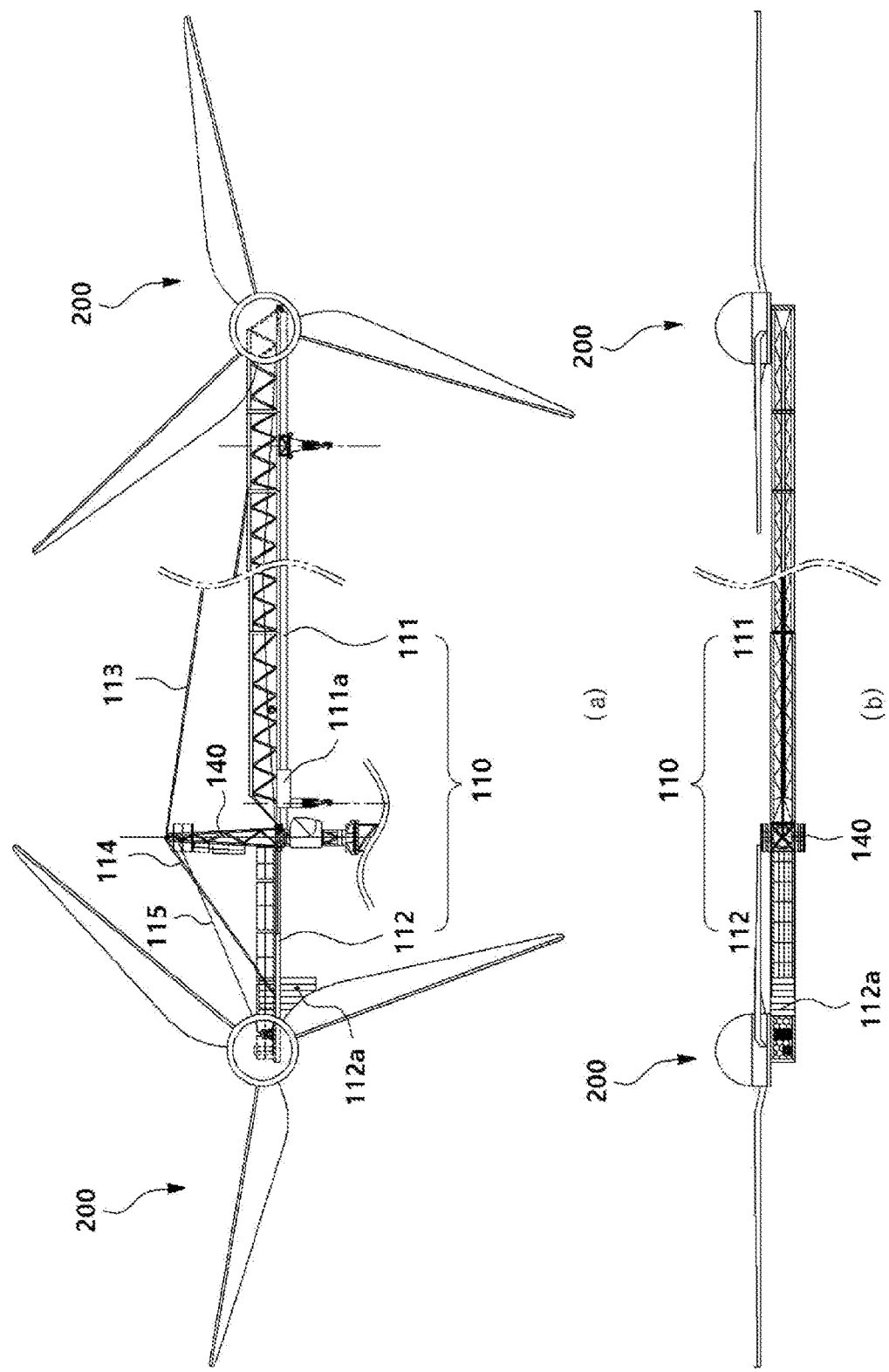
FIG. 3 is a detailed view showing a state in which blade modules are coupled to a jib unit according to an embodiment of the present invention.
Figure 4:
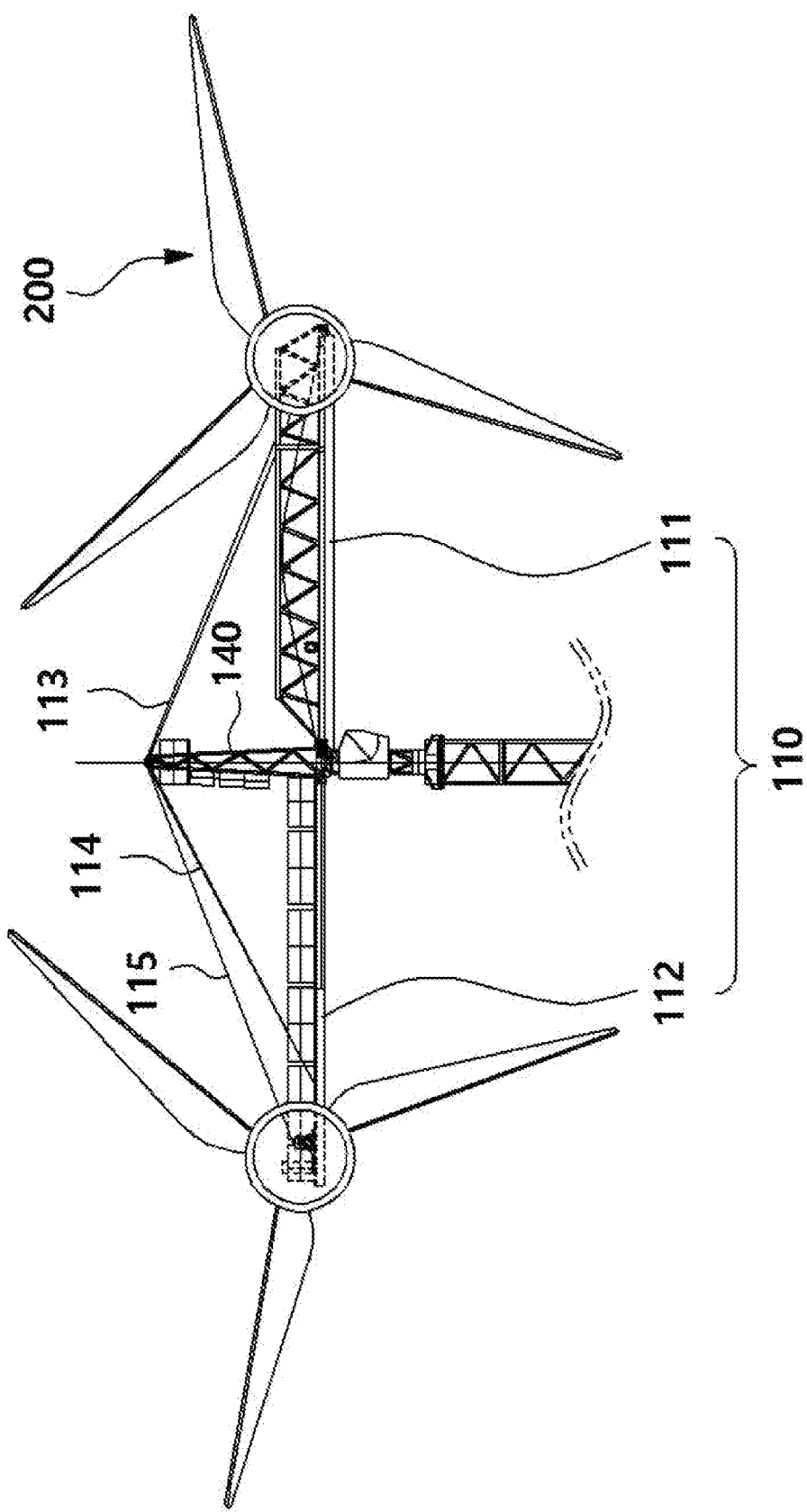
FIG. 4 is a detailed view showing a state in which blade modules are coupled to a jib unit according to another embodiment of the present invention.

FIG. 3 is a detailed view showing a state in which blade modules are coupled to a jib unit according to an embodiment of the present invention, and FIG. 4 is a detailed view showing a state in which blade modules are coupled to a jib unit according to another embodiment of the present invention.

Referring to FIGS. 3 and 4, the jib unit 110 includes: a main jib 111 connected to the swing device control gear unit 160 to swing; a counter jib 112 connected to the swing device control gear unit 160 to swing; a main jib tie bar 113 provided with one end connected to the main jib 111 and the other end connected to the tower head 140 to form tension; a counter jib tie bar 114 provided with one end connected to the counter jib 112 and the other end connected to the tower head 140 to form tension; and a hoisting wire rope 115 provided with one end coupled to an end of the main jib and the other end connected to the tower head 140.

An embodiment of the present invention will be described with reference to FIG. 3. The counter jib 112 further includes a counterweight 112*a*, and the main jib 111 further includes a trolley 111*a* located inside the main jib 111 and configured to be transferred along the main jib and determine a swing radius for hoisting work. Accordingly, the wind power generation apparatus may generate power by using artificially generated wind via the blade module 200 when necessary while functioning as a tower crane. According to the above embodiment, in order to perform the function as a tower crane, the length of the main jib is preferably formed to be longer than that of the counter jib.

Another embodiment of the present invention will be described with reference to FIG. 4. The wind power generation apparatus having a tower crane structure may be configured to perform only a wind power generation function excluding a tower crane function if necessary. In this case, the length of the main jib may be formed to be shorter than that of the main jib of the conventional tower crane, and the main jib and the counter jib may be formed to be the same as shown in the drawings.

Figure 5:
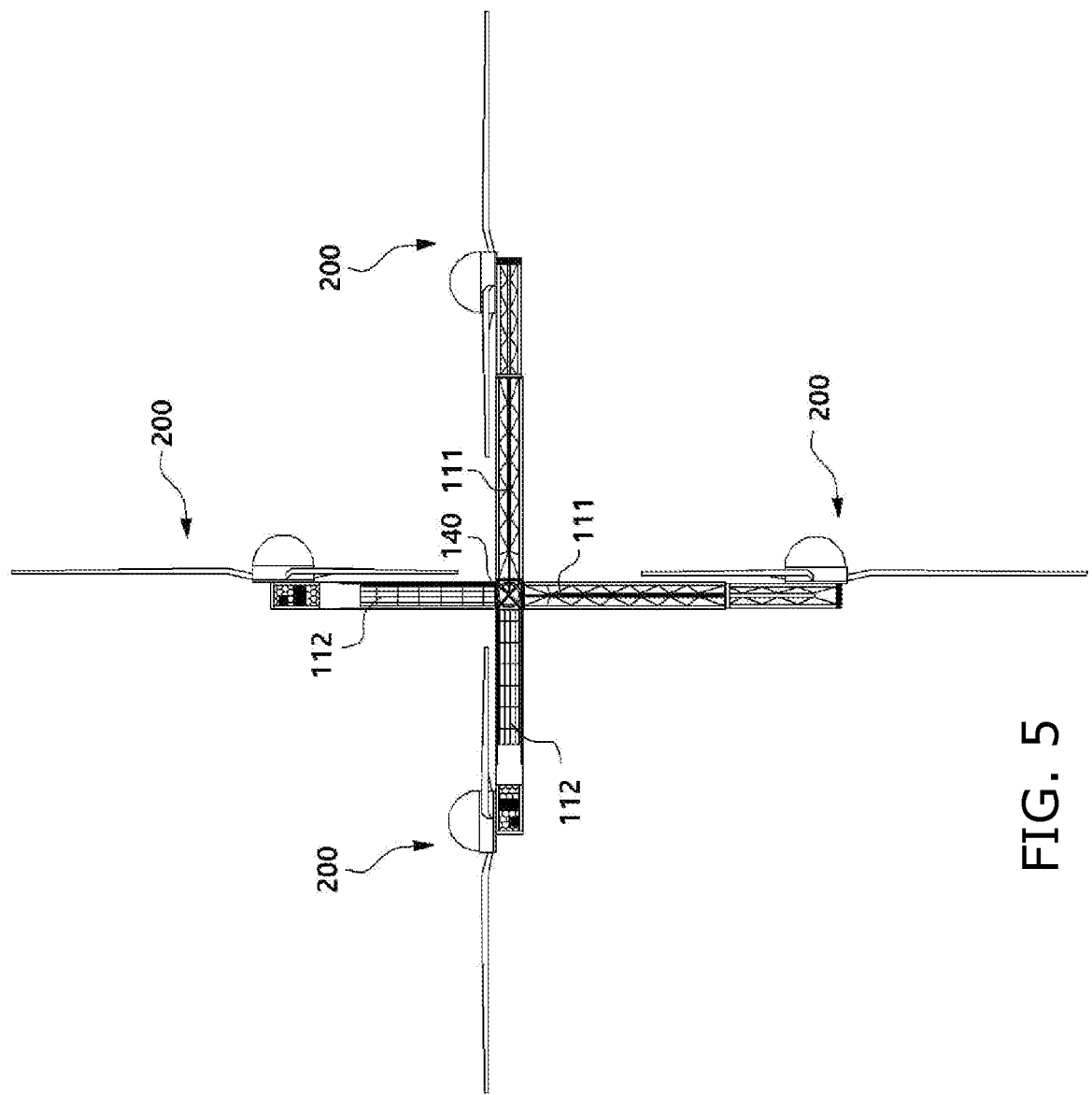
FIG. 5 is a plan view showing a state in which blade modules are coupled to a jib unit according to another embodiment of the present invention.

FIG. 5 is a plan view showing a state in which blade modules are coupled to a jib unit according to another embodiment of the present invention. As shown in FIG. 5, according to the present embodiment of the present invention, pluralities of main jibs and counter jibs may be provided, and blade modules 200 may be provided at ends of the main jibs and counter jibs. Accordingly, wind power generation is performed by operating one or more blade modules with wind power blowing from one or more of the four directions, thereby generating electricity more efficiently.

Figure 6:
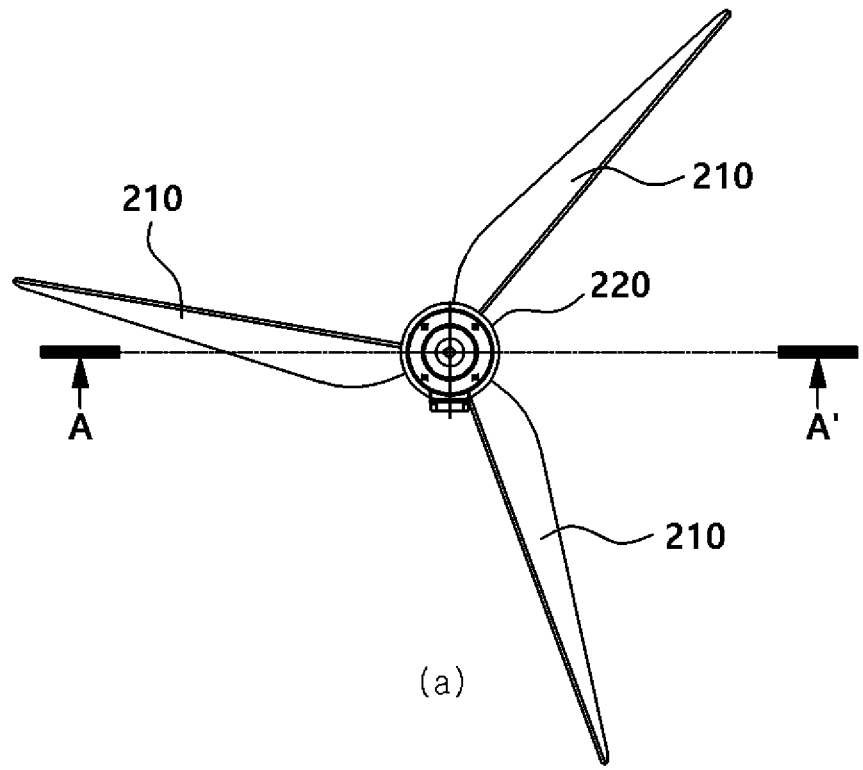
FIG. 6 is a detailed view showing the structure of the blade module according to the present invention.
Figure 6:
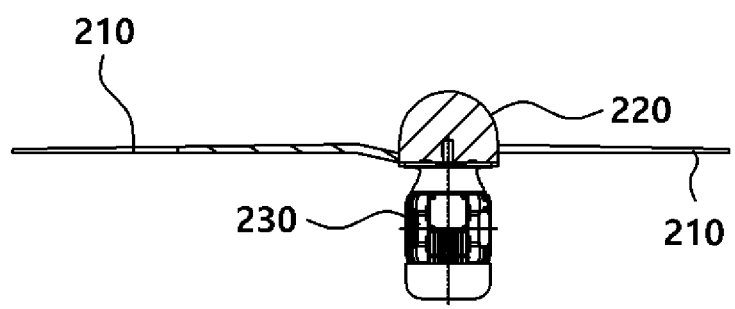

FIG. 6 is a detailed view showing the structure of the blade module according to the present invention.

Referring to FIG. 6, the blade module 200 includes a base frame 220 configured such that a plurality of blade propellers 210 is connected thereto, and a motor unit 230 installed inside the base frame in the widthwise direction.

The blade propellers may be made of a commonly used blade propeller material, such as aluminum or stainless steel material, which has excellent heat resistance and abrasion resistance. Furthermore, the blade propeller may include a material having high wear resistance via a physical or chemical method. According to an embodiment, the blade propellers may be made of a fiber-reinforced plastics (FRP) material obtained by bonding fiber material made of glass or carbon fiber in multiple layers in an outer portion by using a resin and curing it.

Furthermore, the motor unit includes a plurality of ball screw devices driven by a drive motor, a drive sprocket, a chain, and a driven sprocket.

Figure 7:
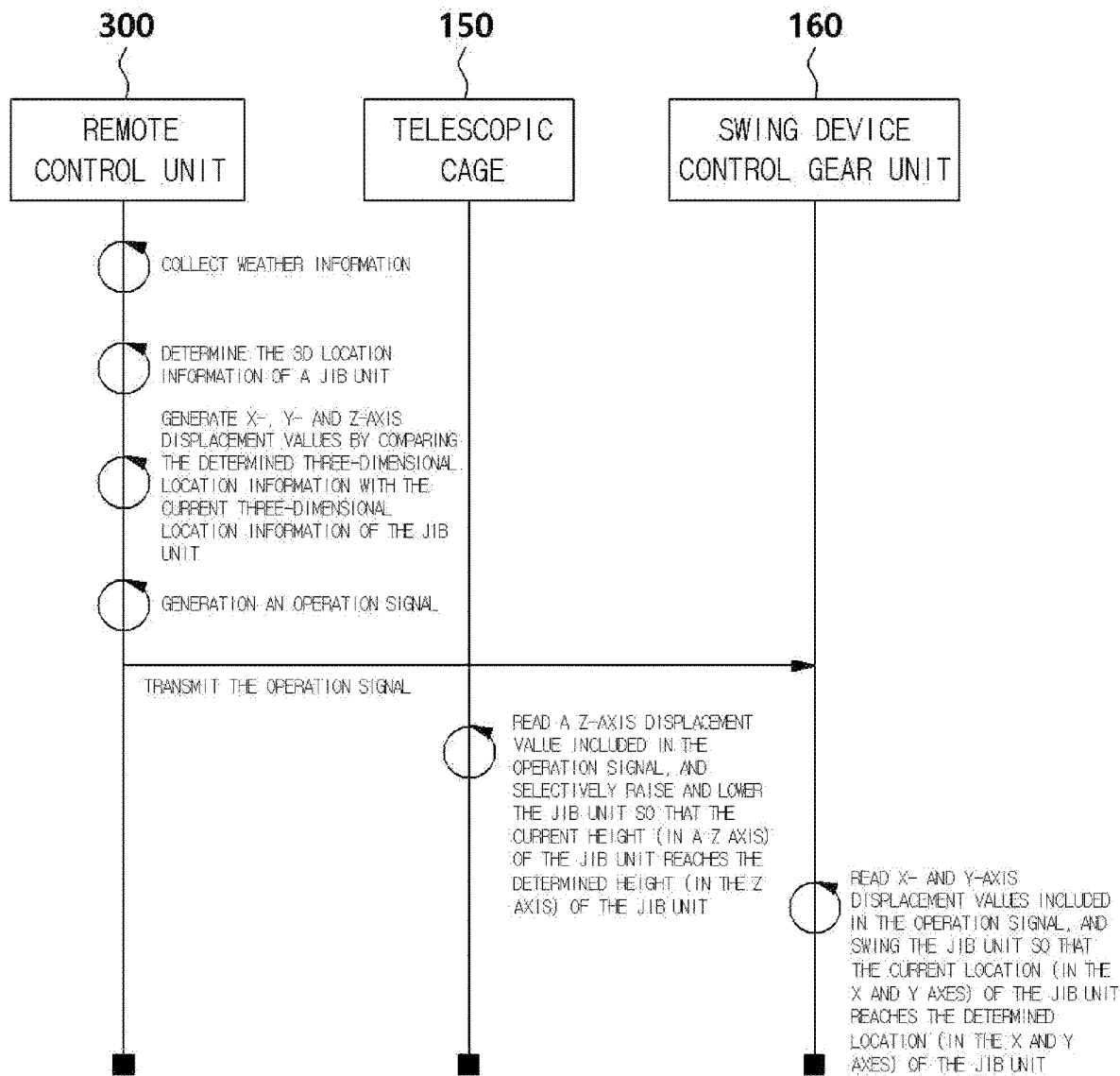
FIG. 7 is a flowchart schematically showing the operation of a wind power generation apparatus having a tower crane structure according to the present invention.

FIG. 7 is a flowchart schematically showing the operation of a wind power generation apparatus having a tower crane structure according to the present invention.

Referring to FIG. 7, the remote control unit 300 collects weather information in real time, determines the 3D location information of the jib unit 110 based on the collected weather information, generates x-, y- and z-axis displacement values by comparing the determined three-dimensional location information with the current three-dimensional location information of the jib unit 110, generates an operation signal based on the generated displacement values, and transfers the generated operation signal to the telescopic cage unit 150 and the swing device control gear unit 160. Thereafter, the processor of the telescopic cage unit 150 reads a z-axis displacement value included in the operation signal and transmits the z-axis displacement value to the hydraulic lifting device, thereby allowing the jib unit 110 to be selectively raised and lowered such that the current height (in the z axis) of the jib unit 110 reaches the determined height (in the z axis) of the jib unit 110. Furthermore, the processor of the swing device control gear unit 160 reads x- and y-axis displacement values included in the operation signal, and swings the jib unit 110 so that the current location (in the x and y axes) of the jib unit 110 reaches the determined location (in the x and y axes) of the jib unit 110. According to the described structure, the blade propellers may be located at an optimum altitude and an optimum direction by considering the wind direction and wind speed of naturally occurring wind, and thus wind power may be generated more effectively.

Figure 8:
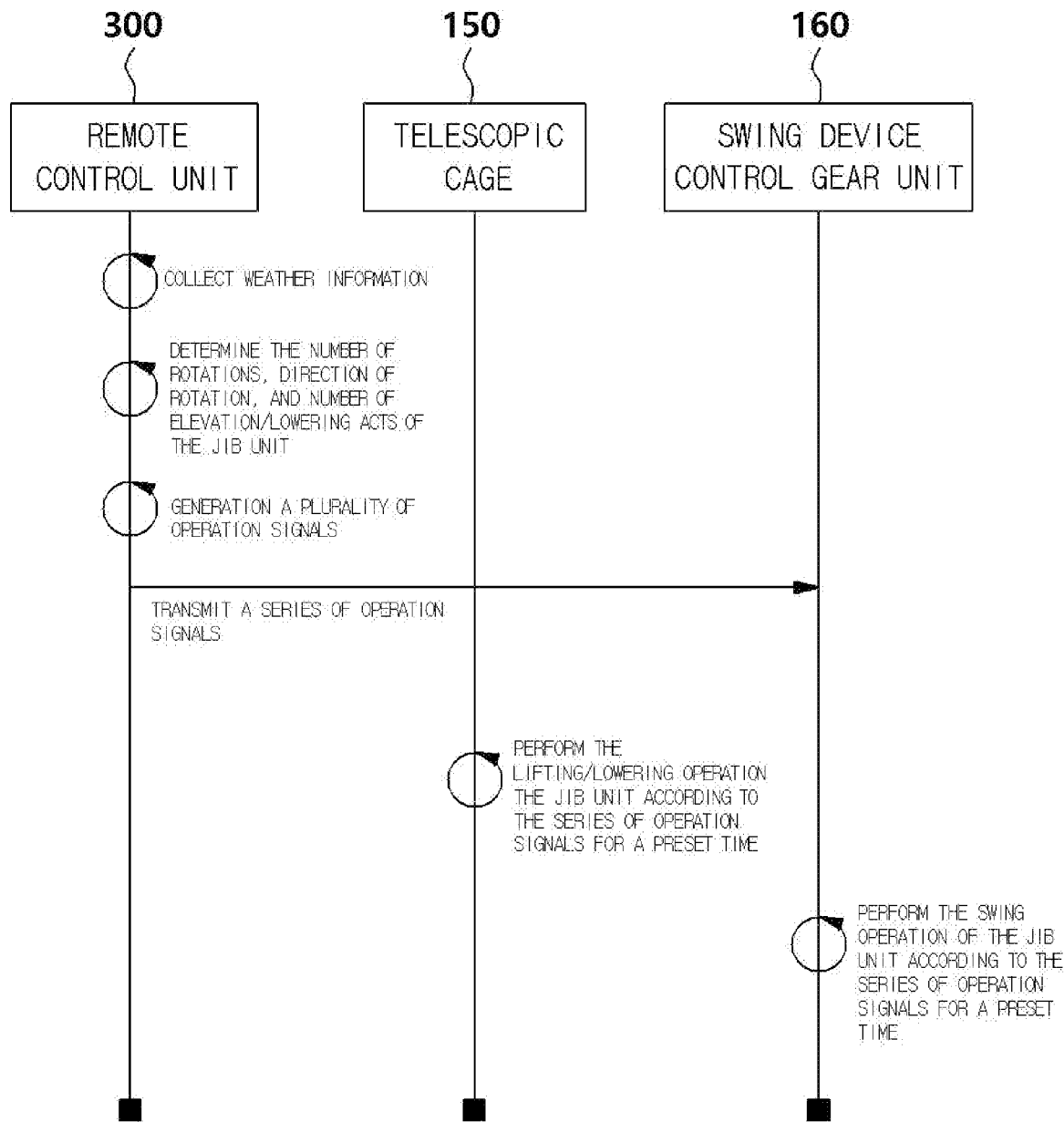
FIG. 8 is a flowchart schematically showing the operation of a wind power generation apparatus having a tower crane structure according to an embodiment of the present invention.

FIG. 8 is a flowchart schematically showing the operation of a wind power generation apparatus having a tower crane structure according to an embodiment of the present invention.

Referring to FIG. 8, the remote control unit 300 determines the number of rotations, direction of rotation, and number of elevation/lowering acts of the jib unit 110 based on collected weather information, generates a plurality of operation signals, and transmits a series of operation signals to the telescopic cage unit 150 and the swing device control gear unit 160. The telescopic cage unit 150 and the swing device control gear unit 160 perform the lifting/lowering operation and swing operation of the jib unit 110 according to the series of operation signals for a preset time, thereby forming artificial wind power and thus performing power generation via the blade modules 200.

According to the invention, wind power required for power generation may be artificially generated according to the lifting/lowering or swing operation of the jib, power generation may be performed more effectively by considering the he wind direction and wind speed of a naturally generated wind because the blade propellers can be positioned at various altitudes and in various directions, and abundant electricity essential for various industrial sectors may be safely generated in and supplies to necessary places regardless of location and environment unlike the conventional wind power generation apparatus.

Although the present invention has been described in detail in conjunction with the specific embodiments, this is intended merely to describe the present invention in detail, and the present invention is not limited thereto. It is obvious that modifications or improvements may be made by those of ordinary skill in the art within the technical spirit of the present invention.

All simple modifications to changes of the present invention fall within the scope of the present invention, and the specific scope of protection of the present invention will be clearly defined by the appended claims.

What is claimed is:

1. A wind power generation apparatus having a tower crane structure, the wind power generation apparatus comprising:
   a basic mast installed perpendicularly to a basic anchor fixed to a ground;
   a cab frame installed on the basic mast;
   a tower head installed at an upper end of the basic mast above the cab frame, and including a lightning rod;
   a jib unit provided on a top of the basic mast capable of vertical movement that includes lifting and lowering operations and swinging movement that includes rotation around a central axis of the basic mast;
   a telescopic cage unit installed on the basic mast and including a processor and a hydraulic lifting device that selectively causes the vertical movement of the jib unit by moving the basic mast; and
   a swing device control gear unit including a processor and a gear configured to cause the swinging movement of the jib unit; and
   one or more blade modules coupled to one or more ends, respectively, of the jib unit and configured to be rotated by wind power to generate electricity; and
   a remote control unit connected to the processor of the telescopic cage unit and the processor of the swing device control gear unit via a wired or wireless connection and configured to remotely control the vertical movement and the swinging movement of the jib unit;
   wherein the remote control unit is configured to:
      receive real-time weather information including wind speed and wind direction;
      compare the wind speed to a threshold value; and
      when the wind speed is below the threshold value:
         determine a movement routine for the jib unit that includes direction of the swinging movement, number of rotations around the central axis, and number of lifting and lowering operations, and
         transmit at least one operation signal to the processor of the telescopic cage unit and the processor of the swing device control gear unit to execute the movement routine and thereby cause air to flow over the one or more blade modules.

2. The wind power generation apparatus of claim 1, wherein the jib unit comprises:
   a main jib connected to the swing device control gear unit to swing;
   a counter jib connected to the swing device control gear unit to swing;
   a main jib tie bar provided with one end connected to the main jib and a remaining end connected to the tower head to form tension;
   a counter jib tie bar provided with one end connected to the counter jib and a remaining end connected to the tower head to form tension; and
   a hoisting wire rope provided with one end coupled to an end of the main jib and a remaining end connected to the tower head.

3. The wind power generation apparatus of claim 2, wherein the remote control unit is further configured to determine a desired three-dimensional (3D) location of the jib unit according to the real-time weather information, generate x-, y- and z-axis displacement values by comparing the determined three-dimensional location with a current three-dimensional location of the jib unit, generate the at least one operation signal based on the generated displacement values; and
   wherein the processor of the telescopic cage unit reads a z-axis displacement value included in the at least one operation signal and transmits the z-axis displacement value to the hydraulic lifting device to perform the lifting and lowering operations such that a current height in the z axis of the jib unit reaches a determined height in the z axis of the jib unit.

4. The wind power generation apparatus of claim 3, wherein the processor of the swing device control gear unit reads x- and y-axis displacement values included in the at least one operation signal, and the gear of the swing device control gear unit swings the jib unit so that a current location in the x and y axes of the jib unit reaches a determined location in the x and y axes of the jib unit.

5. The wind power generation apparatus of claim 4, wherein the counter jib further comprises a counterweight, and the main jib further comprises a trolley located inside the main jib and configured to be transferred along the main jib and determine a swing radius for hoisting work.

6. The wind power generation apparatus of claim 4, wherein each blade module comprises a base frame configured such that a plurality of blade propellers is connected thereto, and a motor unit installed inside the base frame in a widthwise direction.

* * * * *